US012728479B2

(12) United States Patent
Robles Hernández et al.

(10) Patent No.: US 12,728,479 B2
(45) Date of Patent: Sep. 8, 2026

(54) METHOD TO PRODUCE THERMITE WELDS BY APPLYING FIRST AND SECOND VIBRATIONS

(71) Applicant: University of Houston System, Houston, TX (US)

(72) Inventors: Francisco Carlos Robles Hernández, Houston, TX (US); Shelton Ray Taylor, Houston, TX (US)

(73) Assignee: University of Houston System, Houston, TX (US)

( * ) Notice: Subject to any disclaimer, the term of this patent is extended or adjusted under 35 U.S.C. 154(b) by 0 days.

(21) Appl. No.: 17/983,005

(22) Filed: Nov. 8, 2022

(65) Prior Publication Data

US 2023/0147307 A1 May 11, 2023

Related U.S. Application Data

(60) Provisional application No. 63/276,899, filed on Nov. 8, 2021.

(51) Int. Cl.
*B23K 23/00* (2006.01)

(52) U.S. Cl.
CPC .................................... *B23K 23/00* (2013.01)

(58) Field of Classification Search
CPC ................................ B23K 23/00; B22D 27/08
(Continued)

(56) References Cited

U.S. PATENT DOCUMENTS 2,660,414 A * 11/1953 Von Ludwig ........... F27D 27/00 366/116
2,920,362 A * 1/1960 Von Ludwig ............. F27B 5/04 366/116

(Continued)

FOREIGN PATENT DOCUMENTS

DE 102008049947 A1 4/2010
EP 3026132 A1 * 6/2016 ............... C22B 9/00
JP 2014076454 A * 5/2014

OTHER PUBLICATIONS

International Search Report and Written Opinion in corresponding International PCT Application No. PCT/US2022/049274 dated Feb. 24, 2023 (15 pages).

(Continued)

*Primary Examiner* — Keith Walker
*Assistant Examiner* — Carlos J Gamino
(74) *Attorney, Agent, or Firm* — CARTER, DELUCA & FARRELL LLP; George Likourezos; Bret P. Shapiro

(57) ABSTRACT

Methods and systems for producing a thermite weld include applying a first vibration and a second vibration to molten thermite material within a mold between a first piece and a second piece to be welded. The first vibration includes a first vibration frequency and a first amplitude, and the second vibration includes a second vibration frequency and a second amplitude. The first vibration and the second vibration are applied simultaneously to the molten thermite material until the molten thermite material cools below a liquid-to-solid transition temperature. Interference patterns and harmonics between the first vibration and the second vibration enhance the elimination of gas voids within the molten thermite material and enhance grain refinement in the molten thermite material of the resulting thermite weld without damaging the mold.

5 Claims, 3 Drawing Sheets

(58) Field of Classification Search
USPC .................................................. 164/71.1, 260
See application file for complete search history.

(56) References Cited

U.S. PATENT DOCUMENTS

| | | | | |
|---|---|---|---|---|
| 6,338,765 | B1 * | 1/2002 | Statnikov | B23P 9/04<br>148/558 |
| 7,301,123 | B2 * | 11/2007 | Statnikov | B23K 9/091<br>148/558 |
| 11,491,569 | B1 * | 11/2022 | Hamrani | B23K 9/235 |
| 2001/0054492 | A1 * | 12/2001 | Hanano | B22D 18/02<br>164/261 |
| 2003/0150347 | A1 * | 8/2003 | Walker | B23K 23/00<br>102/202.7 |
| 2006/0016858 | A1 | 1/2006 | Statnikov et al. | |
| 2010/0243715 | A1 | 9/2010 | Jury | |
| 2011/0132966 | A1 * | 6/2011 | Lofton | B23K 23/00<br>228/33 |
| 2011/0262766 | A1 * | 10/2011 | Babcsanl | B22D 25/00<br>164/71.1 |
| 2014/0255620 | A1 * | 9/2014 | Shuck | B23K 28/00<br>219/121.45 |
| 2019/0001431 | A1 * | 1/2019 | Stilwell | B23K 23/00 |
| 2022/0009023 | A1 * | 1/2022 | Han | B23K 20/10 |

OTHER PUBLICATIONS

International Preliminary Report on Patentability issued in International Patent Application No. PCT/US2022/049274 dated May 2, 2024.

* cited by examiner

Figure 3:
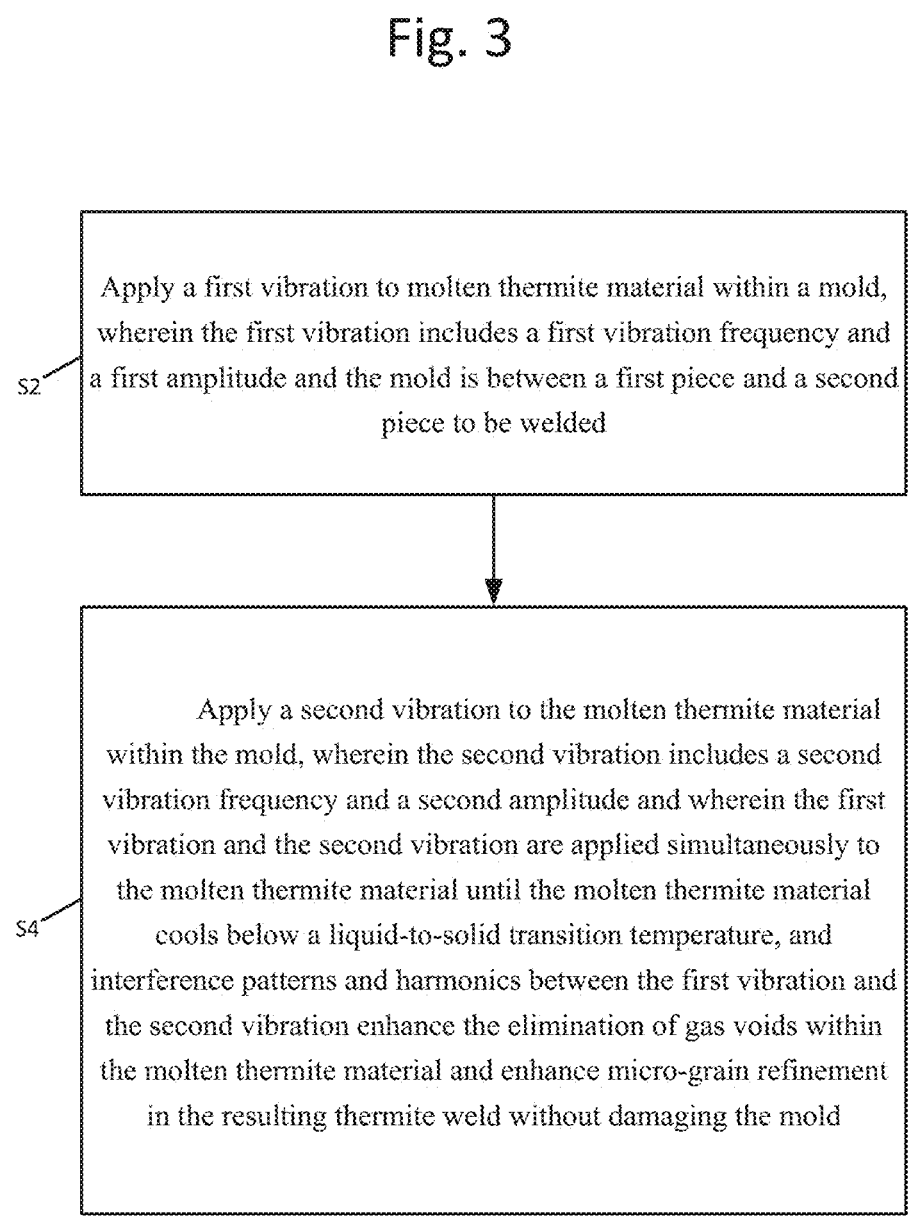

Apply a first vibration to molten thermite material within a mold, wherein the first vibration includes a first vibration frequency and a first amplitude and the mold is between a first piece and a second piece to be welded

S4

Apply a second vibration to the molten thermite material within the mold, wherein the second vibration includes a second vibration frequency and a second amplitude and wherein the first vibration and the second vibration are applied simultaneously to the molten thermite material until the molten thermite material cools below a liquid-to-solid transition temperature, and interference patterns and harmonics between the first vibration and the second vibration enhance the elimination of gas voids within the molten thermite material and enhance micro-grain refinement in the resulting thermite weld without damaging the mold

METHOD TO PRODUCE THERMITE WELDS BY APPLYING FIRST AND SECOND VIBRATIONS

TECHNICAL FIELD

The present disclosure generally relates to thermite welds and thermite welding. More specifically, the present disclosure relates to a system and method to treat molten thermite to produce a thermite weld with increased strength, fatigue life and other improved material properties.

BACKGROUND

Unless otherwise indicated herein, the materials described in this section are not prior art to the claims in this application and are not admitted as being prior art by inclusion in this section.

In the last 50 years, railroad rail hardness has improved from about 248 HBN to >400 HBN through the development of new rail alloy chemistries. Unfortunately, this increase in hardness has not been sufficient to compensate for fatigue related failures at welds, and field welds tend to be the weakest links of a railroad track. This matter is exacerbated over time because when a weld fails, or when a rail defect is repaired, a section of rail is removed and replaced by a rail plug that typically requires two thermite welds.

Thermite welding technology is not limited to only the railways; it is also used for other industries such as oil and gas, steel tanks, mill housing, large structures in ship building (e.g., parts of the stem frame), among a wide variety of other applications. Alloys that are known for using thermite welding include, but are not limited to: copper, cast iron, all types of steel, bronze, brass, Hadfield steel, Monel, and Inconel.

Thermite welds are essential but known to be weak links in applications such as railroad tracks, oil and gas pipelines, and other applications. The limited service-life of thermite welds is due primarily to fatigue cracking initiated at voids created by trapped gas and/or shrinkage within the weld, and to non-optimal strength due to the inability to refine the grain size. Gas porosity may result from the precipitation of gases during liquid-solid phase transformation, and shrinkage pores may be due to the solidification process and thermal contraction combined with lack of melt feeding in solidifying castings. Thermite welds may be similar to castings and may have comparable solidification pathways. Railroad rails, pipes and other components have been optimized metallurgically as a final product or a standalone component; however, the thermite weld used to join these components has not.

A thermite weld may develop pores as it solidifies, either through the precipitation of gases or because of shrinkage pores due to thermal contraction combined with the lack of melt feeding in a solidifying casting. These pores may act as stress risers and may reduce the overall tensile strength of the thermite weld, as well as provide nucleation sites for fatigue failure.

SUMMARY

According to the present disclosure, a field-applied system and method are disclosed which produces thermite welds with extended service life by increasing the metallurgical soundness of the weld. That is, the method according to the present disclosure overcomes existing challenges associated with prior art methods for producing thermite welds. According to the present disclosure, a thermite weld is produced by a vibration process which provides a first and a second vibration to molten thermite to produce the thermite weld with reduced defects for use in rails, pipe welds, and other applications.

The present disclosure includes a method of producing a thermite weld. The method includes applying a first vibration and a second vibration to molten thermite material within a mold between a first piece and a second piece to be welded. The first vibration includes a first vibration frequency and a first amplitude, and the second vibration includes a second vibration frequency and a second amplitude. The first vibration and the second vibration are applied simultaneously to the molten thermite material until the molten thermite material cools below a liquid-to-solid transition temperature. Interference patterns and harmonics between the first vibration and the second vibration enhance the elimination of gas voids within the molten thermite material and enhance grain refinement in the resulting thermite weld without damaging the mold.

In aspects, the method further includes igniting an ignitor within the mold to produce the molten thermite material prior to applying the first vibration and second vibration.

In aspects, the first vibration is produced by a first vibrator and the second vibration is produced by a second vibrator.

In aspects, the first vibration and the second vibration are produced by a single vibration device.

In aspects, the first vibration and the second vibration are generated by mechanical energy, pneumatic energy, hydraulic energy, sound energy, electrical energy, magnetic energy, electromagnetic energy or combinations thereof.

In aspects, the first vibration has a first amplitude, the second vibration has a second amplitude, and the first amplitude is greater than the second amplitude.

In aspects, the first vibration has a first frequency, the second vibration has a second frequency, and the second frequency is greater than the first frequency.

In aspects, the first frequency is between the frequencies of about 1 Hz and about 200 Hz and the second frequency is between the frequencies of about 200 Hz to about 50 kHz.

In aspects, the first piece and the second piece are parts of a railroad track that are to be welded together.

The present disclosure also includes a system for producing thermite welds. The system includes a mold configured to contain molten thermite material therein, the molten thermite material between a first piece and a second piece to be welded together, a first vibrator, and a second vibrator. The first vibrator is configured to apply a first vibration to the molten thermite material within the mold and the second vibrator is configured to apply a second vibration to the molten thermite material. The first vibration and the second vibration are applied simultaneously to the molten thermite material until the molten thermite material cools below a liquid-to-solid transition temperature.

The present disclosure also includes a system for producing thermite welds. The system includes a mold configured to contain molten thermite material therein, the molten thermite material between a first piece and a second piece to be welded together and a vibration device. The vibration device is configured to apply a first vibration and a second vibration to the molten thermite material within the mold. The first vibration and the second vibration are applied simultaneously to the molten thermite material until the molten thermite material cools below a liquid-to-solid transition temperature.

BRIEF DESCRIPTION OF THE FIGURES

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 1 illustrates an exemplary system and method that can be utilized to produce a thermite weld according to the present disclosure;

FIG. 3 illustrates a flow diagram for an example method that can be utilized to produce a thermite weld according to the present disclosure.

DETAILED DESCRIPTION

Figure 2:
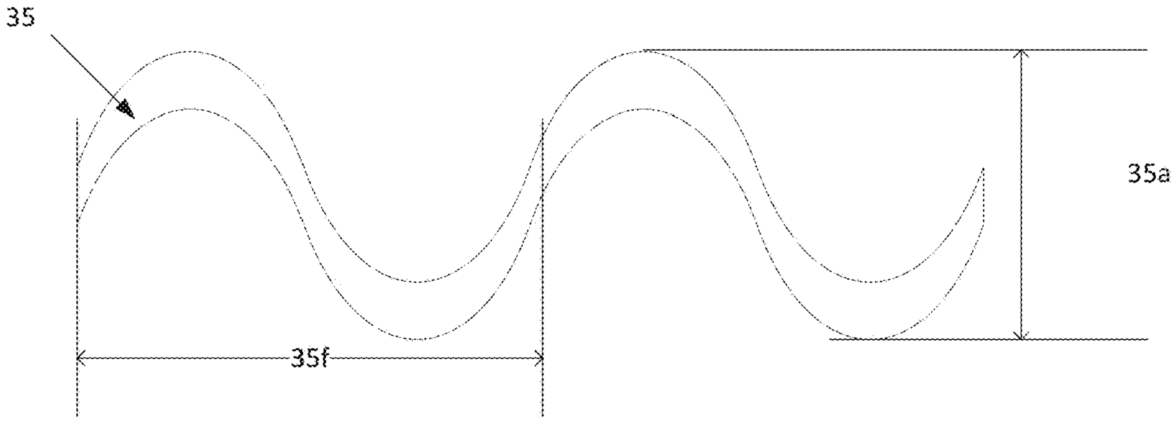
FIG. 2 illustrates interference patterns and harmonics between a first vibration and a second vibration according to the present disclosure.
Figure 2:
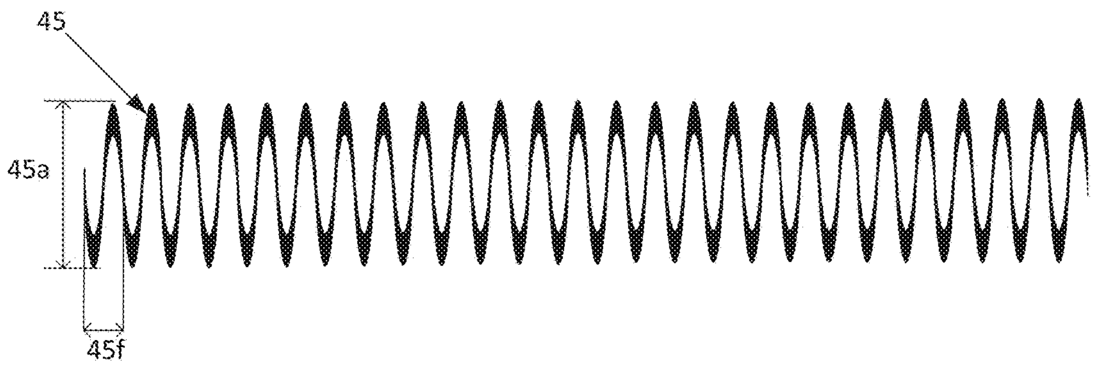
Figure 2:
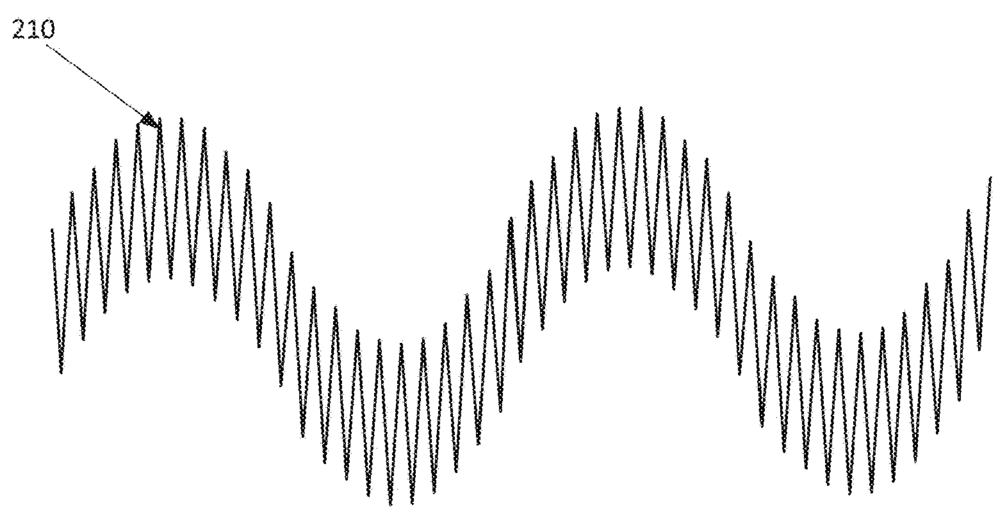

The terminology used herein is for the purpose of describing particular embodiments only and is not intended to be limiting of the present disclosure. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

Unless otherwise defined, all terms (including technical and scientific terms) used herein have the same meaning as commonly understood by one having ordinary skill in the art to which this disclosure belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the present disclosure, it will be understood that a number of systems, methodologies, techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion.

Nevertheless, the specification and claims should be read with the understanding that such combinations are entirely within the scope of the disclosure and the claims.

Novel systems and methods for producing a thermite weld by a vibration process utilizing vibration wave interferences from sources of vibration applied near to molten thermite are described herein. In the following description, for purposes of explanation, numerous specific details are set forth in order to provide a thorough understanding of the present disclosure. It will be evident, however, to one skilled in the art that the present disclosure may be practiced without these specific details.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure includes a vibration process which provides a first and second vibration to molten thermite to produce a thermite weld. Vibration may be produced and introduced into the molten thermite by means of mechanical energy, pneumatic energy, hydraulic energy, sound energy (including, but not limited to ultrasound), electrical energy, magnetic energy, electromagnetic energy or their combinations, or any other potential source that can generate vibration into the weld. Asynchrony of the vibration from multiple sources may provide interference patterns, harmonics, subharmonics and other signal content that amplify the effect of the treatment. Asynchronous vibration treatment may provide significant advantages in the soundness of thermite welds.

A first vibration may have a low frequency between the frequencies of about 1 Hz and about 200 Hz and may be applied to molten thermite within a mold for a thermite weld. A second vibration may have a high frequency of about 200 Hz to about 50 kHz and may be simultaneously applied to the molten thermite within the mold for the thermite weld. The first vibration and the second vibration may have interference and may combine in such a manner to provide a vibration wave with a dual frequency response with an amplitude a combination of the amplitudes of the first vibration and second vibrations. The first and second vibrations may be applied to the molten thermite material within the form for the thermite weld for the period of time from when the thermite material is ignited and starts to liquefy until the thermite material goes below a liquid-to-solid transition temperature or melting point temperature. Applying the first and second vibration during this time may reduce gas and shrinkage porosity within the thermite weld and may cause a significant increase in fatigue life of the thermite weld. Applying the first and second vibration may also provide grain refinement of the thermite weld to increase the strength, fatigue (e.g., endurance) and toughness of the weld.

The proposed technology may take advantage of multiple vibration sources and frequencies and their constructive or destructive interactions in either synchronous or asynchronous frequencies. The multiple vibration frequencies may be generated with a single or multiple vibrators or single or multiple vibration devices capable of producing multiple vibrations.

Figure 1:
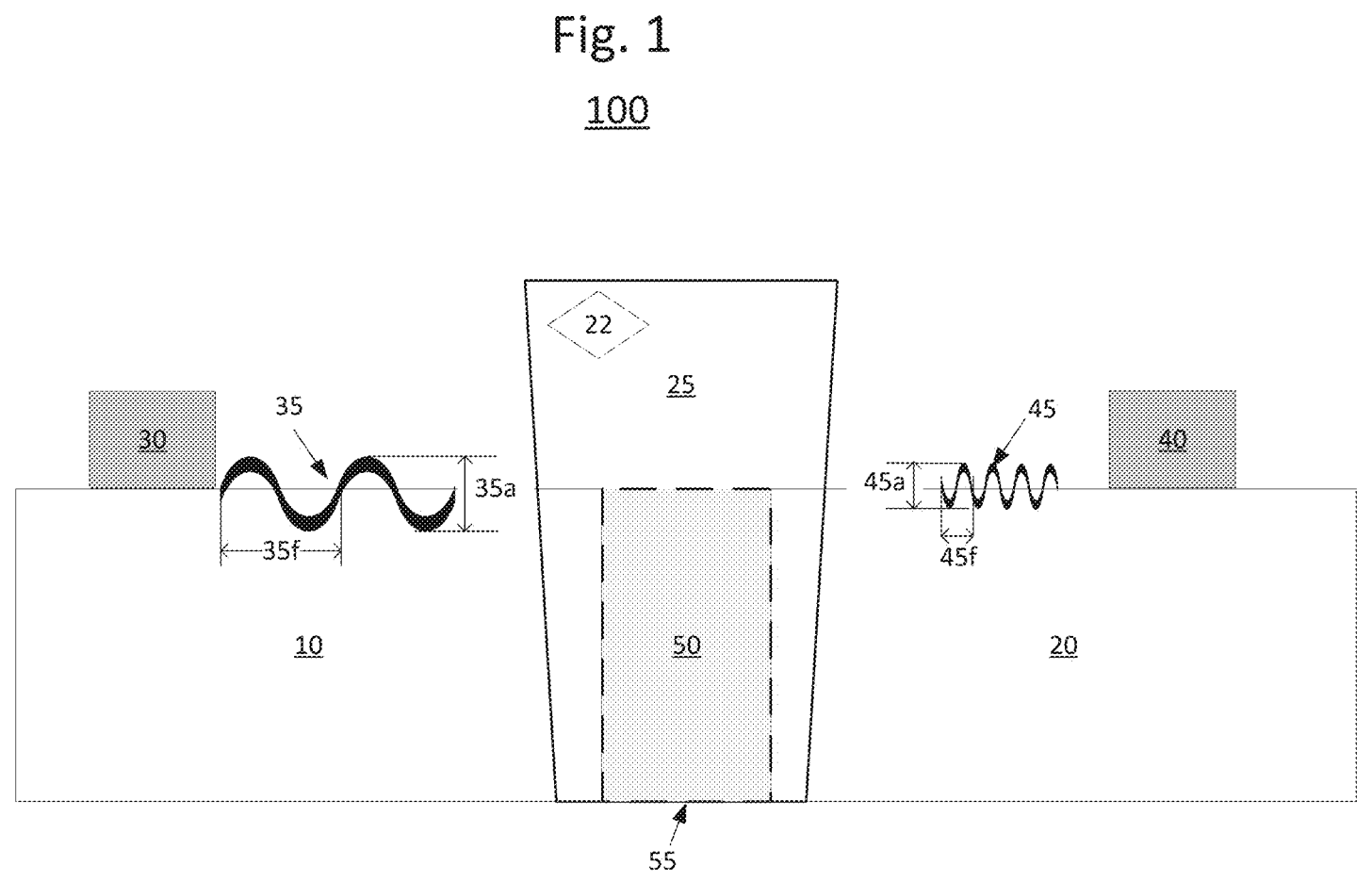

FIG. 1 illustrates an exemplary system and method that can be utilized to produce a thermite weld according to the present disclosure, arranged in accordance with at least some embodiments presented herein. In FIG. 1, system 100 may include a first piece 10 and a second piece 20 to be welded together, an ignitor 22, a mold 25, a first vibrator 30, a second vibrator 40, and molten thermite material 50.

First piece 10 and a second piece 20 may be sections of a railroad track or any other weldments that are to be welded together. Mold 25 may be a suitable weld mold and may be mounted on first piece 10 and second piece 20 so as to align first piece 10 and second piece 20 and create a weld area 55 between first piece 10 and second piece 20. Depending on the alloy to be welded, weld area 55 may be preheated to a suitable temperature for the weld. Once weld area 55 is at suitable temperature for the weld, thermite material may be initiated within mold 25 to melt thermite material within mold 25 and produce molten thermite material 50. In an example, initiation may include igniting ignitor 22 within mold 25 produce molten thermite material 50. Molten thermite material may be at a temperature of about 1,400° C. (2,550° F.) or above. Molten thermite material 50 may flow into and fill weld area 55 between first section 10 and second section 20.

First vibrator 30 may produce a first vibration 35 with an amplitude 35*a* and a frequency 35*f*. Frequency 35*f* may be a low frequency between the frequencies of about 1 Hz and about 200 Hz. Second vibrator 40 may produce a second vibration 45 with an amplitude 45*a* and a frequency 45*f*. Frequency 45*f* may be a high frequency between the frequencies of about 200 Hz to about 50 kHz. Amplitude 35*a* and amplitude 45*a* may be between about 1 lb/in$^2$ to 1,000 lb/in$^2$ First amplitude 35*a* may be greater than second amplitude 45*a*. First vibration 35 and second vibration 45 may be applied between when thermite material 50 is ignited and starts to liquefy at a temperature of about 1,400° C. (2,550° F.) or above until molten thermite 50 cools and begins to solidify at a melting point temperature, $T_M$ at a temperature of about 1,200° C. (2,190° F.) or below. The time period that first vibration 35 and second vibration 45 may be applied may be on the order of a few seconds to a few minutes. First vibration 35 and second vibration 45 may be applied to molten thermite material 50 for shorter time periods or for intermittent time periods between when thermite material 50 is ignited and starts to liquify until thermite material 50 goes below the liquid-to-solid transition temperature or melting point temperature $T_M$. Vibrations 35 and 45 may stop being applied once thermite material 50 cools to melting point temperature $T_M$.

Characteristics such as amplitude 35*a*, 45*a* and frequency 35*f*, 45*f* of first vibration 35 and second vibration 45 may be based on the molten thermite material 50 composition, conditions, and temperature where the thermite weld method may be applied. A fastening system may be used to attach first vibrator 30 and/or second vibrator 40 on to the weld area or structure carrying the weld and may be any securement system known in the art. First vibrator 30 and/or second vibrator 40 may be any known vibration device such as a vibrator or ultrasound device and may produce vibration by means of mechanical energy, pneumatic energy, hydraulic energy, sound energy (including, but not limited to ultrasound), electrical energy, magnetic energy, electromagnetic energy and their combinations, or any other potential source that can generate vibration. First vibrator 30 and/or second vibrator 40 may be non-contact vibration devices and generate vibrations such as sound waves, induction, electromagnetic, etc. Vibration generated by first vibrator 30 and/or second vibrator 40 may be transmitted to mold 25 and weld area 55 and applied to molten thermite 50 within.

First vibrator 30 and/or second vibrator 40 may also be attached to other rail construction components, e.g., instrumented frames or devices proximate to mold 25 and weld area 55. First vibrator 30 and/or second vibrator 40 may be any distance from mold 25 and weld area 55 which ensures the transfer of the vibration to weld area 55 in a range that is adequate for the weld treatment. For example, first vibrator 30 and second vibrator 40 may be at distances between about 0.01 m (4 inches) to about 3 m (10 ft) from mold 25 and weld area 55 without requiring significant differences in amplitude or frequency of vibration 35 or 45, although longer or shorter distances may be used. Longer distances may oversee a decay in effectiveness which may be compensated for by using higher amplitude or frequencies in vibrations 35 or 45, however higher amplitudes may result in damage to mold 25. Thermite mold 25 may be made from sand and a binder, and may be ceramic or graphite with a sand core and clay seal material. Thermite mold 25 may be two or more pieces and may be stepped to form a composite mold when first piece 10 and second piece 20 have mismatched profiles. Thermite mold 20 may be a prefabricated one time use mold. Those skilled in the art would be able to select a suitable thermite mold 25 based on the required thermite weld.

First vibrator 30 and/or second vibrator 40 may be replaced by a single device capable of producing multiple vibrations or multiple vibrators (such as three or more vibrators) and there is no restriction in terms of the orientation (parallel, perpendicular or other(s)) of first vibrator 30 and/or second vibrator 40 with respect to mold 25 and weld area 55. In another embodiment, one or both of vibrator 30 and vibrator 40 may be capable of producing multiple vibrations and the multiple vibrations produced interact within molten thermite 50.

Lower vibration frequencies such as between 0 Hz and 1 kHz may be characterized by long vibration waves. Higher vibration frequencies above 20 kHz may result in cavitation within the weld and may be detrimental to weld quality. A vibration signal from a single source such as first vibrator 30 or second vibrator 40 may include a combination of two or more sine waves and may have the potential to behave like a multi-source apparatus and provide a frequency content equivalent to two (or more) vibration sources. For example, a single vibration device may include both a first and second vibration source and may be configured to provide both first vibration 35 at frequency 35*f* and second vibration 45 at frequency 45*f*.

Frequencies 35*f* and 45*f* may change depending on the vibration source (e.g., electric, magnetic, hydraulic, etc.) of vibrators 30 and 40. Pressure during the weld treatment may vary over a wide range between about 1 Pa to about 200 MPa; however, the pressure amplitude may be higher or lower depending on the weld requirements.

Thermite welds may include two types of void defects, gas and shrinkage, and each respective defect may respond to different frequencies of vibration. As molten thermite material 50 begins to cool, but prior to a liquid-to-solid transition temperature (or melting point, $T_M$), first vibration 35 and second vibration 45 may be applied to molten thermite material 50 to remove dissolved gases. Vibration 35 and vibration 45 may be applied to molten thermite material 50 by two or more vibration sources such as first vibrator 30 and second vibrator 40 respectively, where first vibrator 30 and second vibrator 40 differ in frequency of vibrations.

A difference in frequency and phase of vibrations between first vibration 35 and second vibration 45 may introduce interference patterns and harmonics that enhance the elimination of gas voids in molten thermite material 50 and may also enhance grain refinement within the weld resulting in increased strength and toughness of the resulting thermite weld.

FIG. 2 illustrates interference patterns and harmonics between a first vibration and a second vibration according to the present disclosure, arranged in accordance with at least some embodiments presented herein. Those components in FIG. 2 that are labeled identically to components of FIG. 1 will not be described again for the purposes of brevity.

In FIG. 2, first vibration 35 is illustrated with amplitude 35*a* and frequency 35*f* and second vibration 45 is illustrated with amplitude 45*a* and frequency 45*f*. Frequency 35*f* of first vibration 35 may be lower than frequency 45*f* of second vibration 45 as illustrated by a longer waveform. Amplitude 35*a* of first vibration 35 may be greater than amplitude 45*a* of second vibration 45 as illustrated by a taller waveform. As shown in FIG. 1, first vibration 35 and second vibration 45 may be applied simultaneously to mold 25 and weld area 55. First vibration 35 and second vibration 45 may be introduced into molten thermite 50 and may provide significant advantages in the soundness of a thermite weld formed from vibration treated molten thermite 50.

First vibration 35 and second vibration 45 may have constructive or destructive interactions within molten thermite 50 resulting in a composite vibration waveform 210 based on interference patterns, harmonics, sub-harmonics and other signal content of first vibration 35 and second vibration 45 within molten thermite 50. Composite vibration waveform 210 interacting with molten thermite 50 may enhance the elimination of gas voids in molten thermite material 50 and produce grain refinement within cooling molten thermite material 50 resulting in increased strength and toughness of the resulting thermite weld.

Constructive interference between first vibration 35 and second vibration 45 may result in composite vibration waveform 210 including a waveform with a frequency of 45*f* and amplitude 45*a* traveling along a wave form of frequency 35*f* and an amplitude of 35*a*. In such a scenario, composite vibration waveform 210 may have a higher total amplitude than first vibration 35 and second vibration 45 individually; and may provide superior elimination of gas voids in molten thermite material 50 without increasing amplitudes of first vibration 35 or second vibration 45. As previously stated, vibration with a high amplitude may result in damage to mold 25 and a thermite weld of lesser quality.

As previously described, first vibrator 30 and second vibrator 40 may produce vibration to molten thermite material 50 with a difference in frequency and phase of vibrations to introduce interference patterns and harmonics that enhance the elimination of gas voids in molten thermite material 50 and may enhance grain refinement of the resulting thermite weld for a time period from when the thermite material is molten until the molten thermite 50 cools below melting point temperature $T_M$.

A system in accordance with the present disclosure may enhance the elimination of gas voids in molten thermite material to produce thermite welds with superior fatigue resistance, strength, endurance, and/or toughness. A system in accordance with the present disclosure may provide thermite welds with grain refinement resulting in enhanced thermite welds. A system in accordance with the present disclosure may provide thermite welds with longer lifespans and minimize future repairs. A system in accordance with the present disclosure may eliminate or reducing pores caused by both gas and shrinkage within molten thermite as it cools and may significantly improve the fatigue resistance, strength, toughness, etc. of thermite welds. A system in accordance with the present disclosure may provide thermite welds with an increase in fatigue endurance limit of up to 30% and a weld strength improved by 12%.

FIG. 3 illustrates a flow diagram for an example method that can be utilized to produce a thermite weld, arranged in accordance with at least some embodiments described herein. An example process may include one or more operations, actions, or functions as illustrated by one or more of blocks S2, and/or S4. Although illustrated as discrete blocks, various blocks may be divided into additional blocks, combined into fewer blocks, or eliminated, depending on the desired implementation.

The method may begin at block S2, "Apply a first vibration to molten thermite material within a mold, wherein the first vibration includes a first vibration frequency and a first amplitude, and the mold is between a first piece and a second piece to be welded." At block S2, a first vibration is applied to molten thermite material within a mold. The first vibration includes a first vibration frequency and a first amplitude. The mold is between a first piece and a second piece to be welded together. The first vibration may be produced by a first vibration device.

Processing may continue from block S2 to block S4, "Apply a second vibration to the molten thermite material within the mold, wherein the second vibration includes a second vibration frequency and a second amplitude and wherein the first vibration and the second vibration are applied simultaneously to the molten thermite material until the molten thermite material cools below a liquid-to-solid transition temperature, and interference patterns and harmonics between the first vibration and the second vibration enhance the elimination of gas voids within the molten thermite material and enhance grain refinement in the resulting thermite weld without damaging the mold." At block S4, a second vibration is applied to the molten thermite material within the mold. The second vibration includes a second vibration frequency and a second amplitude. The second vibration may be produced by a second vibration device or also by the first vibration device. The first vibration and the second vibration are applied simultaneously to the molten thermite material until the molten thermite material cools below a liquid-to-solid transition temperature. Interference patterns and harmonics between the first vibration and the second vibration enhance the elimination of gas voids within the molten thermite material and enhance grain refinement in the cooling molten thermite material and the resulting thermite weld without damaging the mold.

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

The invention claimed is:

1. A method for producing a thermite weld, the method comprising:

applying a first vibration to molten thermite material within a mold at a first orientation, wherein the first vibration includes a first vibration frequency between about 1 Hz and about 200 Hz and a first amplitude, the mold is between a first piece and a second piece to be welded, and the first vibration is produced by a first vibrator on the first piece at a distance of about 2 m to about 3 m from the mold; and applying a second vibration to the molten thermite material within the mold at a second orientation, wherein the second vibration includes a second vibration frequency between about 1 kHz and about 50 kHz and a second amplitude, and the second vibration is produced by a second vibrator on the second piece at a distance of about 2 m to about 3 m from the mold;

wherein the first vibration is applied to the molten thermite material until the molten thermite material goes below a liquid-to-solid transition temperature and the second vibration is applied to the molten thermite material at intermittent periods of time until the molten thermite material goes below the liquid-to-solid transition temperature, the first vibration and the second vibration have constructive or destructive interactions within the molten thermite material resulting in a composite vibration waveform based on interference patterns, harmonics, and sub-harmonics, the first and second vibrations enhance the elimination of gas and shrinkage pores within the molten thermite material, and the first vibration enhances grain refinement in the thermite weld without damaging the mold.

2. The method of claim 1, further comprising igniting an ignitor within the mold to produce the molten thermite material prior to applying the first vibration and second vibration.

3. The method of claim 1, wherein the first vibration and the second vibration are generated by mechanical energy, pneumatic energy, hydraulic energy, sound energy, electrical energy, magnetic energy, electromagnetic energy or combinations thereof.

4. The method of claim 1, wherein the first amplitude is greater than the second amplitude.

5. The method of claim 1, wherein the first piece and the second piece are parts of a railroad track that are to be welded together.

* * * * *